US012742651B2

(12) United States Patent
Roy et al.

(10) Patent No.: US 12,742,651 B2
(45) Date of Patent: Sep. 22, 2026

(54) SYSTEM AND METHOD FOR ROUTE GUIDANCE USING AUGMENTED REALITY

(71) Applicant: CENTRE FOR DEVELOPMENT OF TELEMATICS, New Delhi (IN)

(72) Inventors: Sudipta Roy, New Delhi (IN); Avinash Kumar, New Delhi (IN); Deepak Kumar Gupta, New Delhi (IN); Lata Kiran Dey, New Delhi (IN); Rajendra Kumar, New Delhi (IN); Biren Karmakar, New Delhi (IN); Shikha Srivastava, New Delhi (IN)

(73) Assignee: CENTRE FOR DEVELOPMENT OF TELEMATICS, New Delhi (IN)

( * ) Notice: Subject to any disclaimer, the term of this patent is extended or adjusted under 35 U.S.C. 154(b) by 0 days.

(21) Appl. No.: 19/136,782

(22) PCT Filed: Dec. 7, 2023

(86) PCT No.: PCT/IB2023/062347
§ 371 (c)(1),
(2) Date: Jun. 6, 2025

(87) PCT Pub. No.: WO2024/121785
PCT Pub. Date: Jun. 13, 2024

(65) Prior Publication Data

US 2026/0202211 A1 Jul. 16, 2026

(30) Foreign Application Priority Data

Dec. 7, 2022 (IN) ............................ 202211070522

(51) Int. Cl.
*G01C 21/36* (2006.01)
*G06F 3/01* (2006.01)
*G06T 19/00* (2011.01)

(52) U.S. Cl.
CPC .......... *G01C 21/365* (2013.01); *G06F 3/012* (2013.01); *G06T 19/006* (2013.01)

(58) Field of Classification Search
CPC ...... G01C 21/365; G06F 3/012; G06T 19/006
See application file for complete search history.

(56) References Cited

U.S. PATENT DOCUMENTS 11,624,627 B2 * 4/2023 Woo .................. G01C 21/3632 701/431
2014/0274240 A1 * 9/2014 Meadows ............ A63F 13/216 463/3

(Continued)

*Primary Examiner* — Hussein Elchanti
(74) *Attorney, Agent, or Firm* — Bochner PLLC; Andrew D. Bochner

(57) ABSTRACT

The present disclosure relates to a system (300) for providing route guidance using augmented reality, the system includes a processor (502) to obtain a set of orientation parameters of a subject (304) based on one or more sensors accommodated in a computing device (302) associated with the subject and determine one or more motion parameters associated with the subject to reach the destination from a target location. The processor generates a set of arrows indicating at least one direction of the path from the target location of the subject to the destination, wherein when the set of orientation parameters deviates from the one or more motion parameters, the processor configured to calculate a degree of rotation to align the set of arrows indicating the at least one direction of the path along the desired direction to reach the destination to facilitate route guidance.

10 Claims, 7 Drawing Sheets

(56) References Cited

U.S. PATENT DOCUMENTS

| | | | | |
|---|---|---|---|---|
| 2015/0379360 | A1* | 12/2015 | Rhee | G06F 3/011 345/633 |
| 2021/0156695 | A1* | 5/2021 | Zhang | G06T 19/006 |
| 2021/0306811 | A1* | 9/2021 | Hapola | A63B 24/0021 |
| 2021/0397252 | A1* | 12/2021 | Nakade | G06F 1/163 |
| 2022/0221296 | A1* | 7/2022 | Correia Duarte Furtado | A61H 3/061 |

* cited by examiner

100

200

SYSTEM AND METHOD FOR ROUTE GUIDANCE USING AUGMENTED REALITY

TECHNICAL FIELD

The present disclosure relates, in general, to indoor navigation systems, and more specifically, relates to a system and method for providing route guidance using augmented reality.

BACKGROUND

Currently, the indoor navigation application is getting popularity due to emerging demands for use in complex buildings, shopping malls and the like. The most common and popularly used user interface is a two-dimensional floor map with a route showing from source to destination. However, it suffers from the limitation of posing cognitive load for users. The most popularly growing trend is the Augmented reality-based indoor navigation system (AR-BIN), which gives navigation instructions in the real-world environment, to produce a better experience.

An indoor navigation system consists of four components such as positioning, wayfinding, motion tracking and route guidance. Positioning refers to determining the user's current position, wayfinding to search the route from the user's source location to the chosen destination, and motion tracking aims to determine the direction (azimuth) and pitch of the smartphone based on the magnetic sensors and acceleration sensor of a smartphone, and route guidance overlay a directional indicator in a real-world environment.

In an existing system 100, when the initial face of the user while starting the application is not the same as the expected face orientation and the user starts moving towards the heading direction, the arrows may be pointing towards the direction where the user initially had started the application, as shown in FIG. 1A to FIG. 1C respectively.

As shown in FIG. 1A, the facing of the user is towards the north and the heading direction is towards the east. Contrary to this, the arrow is pointing towards the north same as the initial facing of the user and the path is drawn towards the heading direction i.e., east. In FIG. 1B, the facing of the user is towards the south and the heading direction is towards the east. In contrary to this, the arrow is pointing towards the south same as the initial facing of the user and the path is drawn towards the heading direction i.e., east. Similarly, in FIG. 1C, the facing of the user is towards the southwest and the heading direction is towards the east. In contrary to this, the arrow is pointing towards the southwest same as the user's initial facing and the path is drawn towards the heading direction i.e., east.

Another way to rectify the deviation is to rotate the directional indicator by an angle equal to the difference between the heading angle and the user's initial facing as follows:

Estimated degree of rotation=(I−H+360) % 360. However, this also does not make a directional indicator pointing towards the heading direction as shown in FIG. 2A to FIG. 2C respectively.

The existing system 200 shown in FIG. 2A, the facing of the user is towards the north and the heading direction is towards the east. In contrary to this, the arrow is pointing towards the northwest and the path is drawn towards the heading direction i.e., east. In FIG. 2B, the facing of the user is towards the east and the heading direction is towards the east. In this case, the arrow is pointing towards the east and the path is drawn towards the heading direction i.e., east. In FIG. 2C, the facing of the user is towards the southwest and the heading direction is towards the east. In contrary to this, the arrow is directed towards the southwest same as the initial facing of the user and the path is drawn towards the heading direction.

Therefore, it is desired to overcome the drawbacks, shortcomings, and limitations associated with existing solutions, and develop a system that improves the preciseness of route guidance.

OBJECTS OF THE PRESENT DISCLOSURE

An object of the present disclosure relates, in general, to indoor navigation systems, and more specifically, relates to a system and method for providing route guidance using augmented reality.

Another object of the present disclosure is to provide a system that determines a path from the target location of the subject to the destination of the subject effectively.

Another object of the present disclosure is to provide a system that provides an estimated degree of rotation for improving the preciseness of route guidance.

Another object of the present disclosure is to provide a system that aligns the directional indicator along the heading direction of the subject when the initial facing of the subject while starting the application is not the same as the expected face orientation.

Another object of the present disclosure provides a computing device to be used in any orientation with respect to the user during the different activities.

Yet another object of the present disclosure is to provide an efficient route guidance system.

SUMMARY

The present disclosure relates in general, to indoor navigation systems, and more specifically, relates to a system and method for providing route guidance using augmented reality. The main objective of the present disclosure is to overcome the drawback, limitations, and shortcomings of the existing system and solution, by providing a system that uses built-in sensors of the computing device to get user orientation and integrates with a set of instructions e.g., ARCore SDK to display AR guidance using known latitude and longitude of waypoints on a given route. The system is adapted to align the directional indicator i.e., a set of arrows indicating at least one direction of the path along the heading direction of the subject when initial-facing of the subject while starting the application is not the same as the expected face orientation and the user starts moving towards heading direction.

The system can include a processor operatively coupled to a memory, the memory storing instructions executable by the processor to obtain a set of orientation parameters of a subject based on one or more sensors accommodated in the computing device that is associated with the subject in a venue. The set of orientation parameters pertaining to the position and face orientation of the subject and the venue can be any indoor location.

The processor can determine one or more motion parameters associated with the subject to reach the destination from a target location based on one or more sensors associated with the computing device. The one or more motion parameters pertaining to the expected face orientation i.e., the heading direction of the subject. Further, the processor generates a set of arrows indicating at least one direction of the path from the target location of the subject to the destination, wherein when the set of orientation parameters of the subject deviates from the one or more motion parameters of the subject, the processor configured to calculate a degree of rotation for the set of arrows indicating the at least one direction of the path to align the set of arrows indicating the at least one direction of the path along the desired direction to reach the destination. The set of arrows indicating the at least one direction of the path from the target location of the subject to the destination of the subject is displayed to facilitate route guidance, thereby the computing device can be used in any orientation with respect to the user/subject during the different activities.

Further, the processor calculates and uses the estimated degree of rotation for improving the preciseness to facilitate route guidance, where the estimated degree of rotation is AoR+H−(I−a). Accordingly, the processor is configured to calculate the degree of rotation to make the set of arrows align along the heading direction of the subject when the initial face orientation of the subject is not the same as the expected face orientation.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The following drawings form part of the present specification and are included to further illustrate aspects of the present disclosure. The disclosure may be better understood by reference to the drawings in combination with the detailed description of the specific embodiments presented herein.

DETAILED DESCRIPTION

Figure 1C:
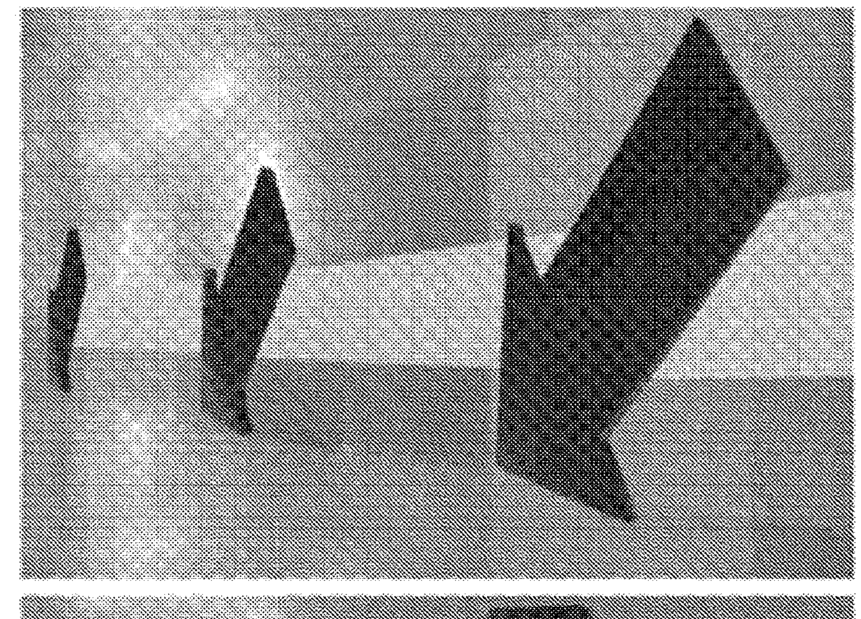
FIG. 1A to FIG. 1C is an existing system illustrating arrow direction same as user initial facing.
Figure 1B:
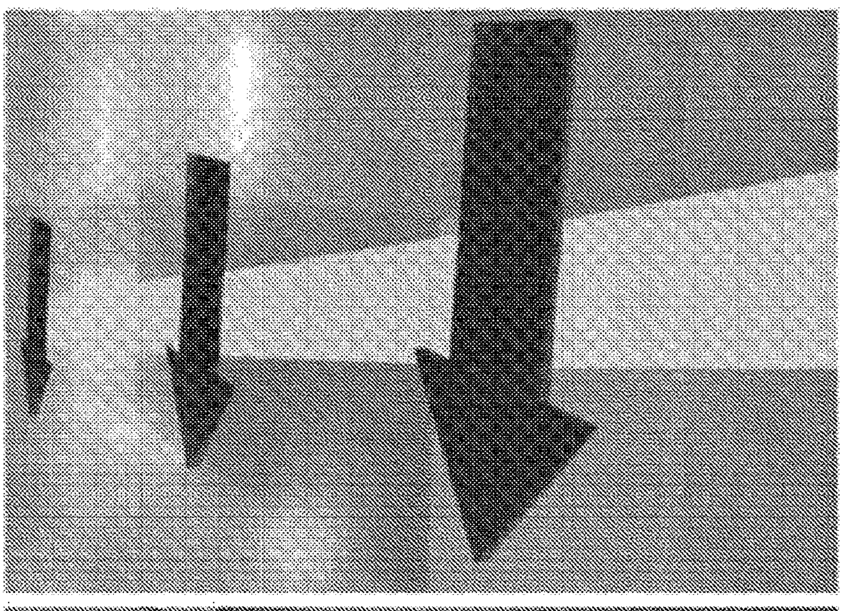
Figure 1A:
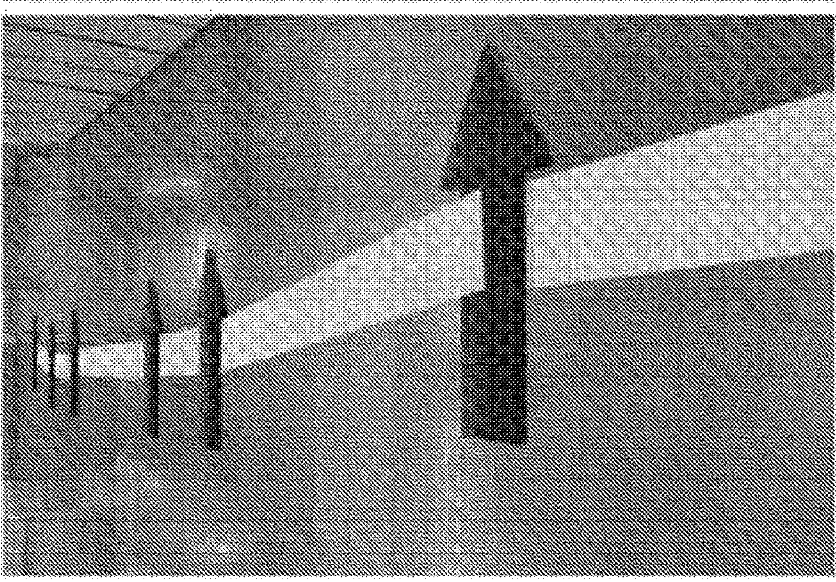
Figure 2C:
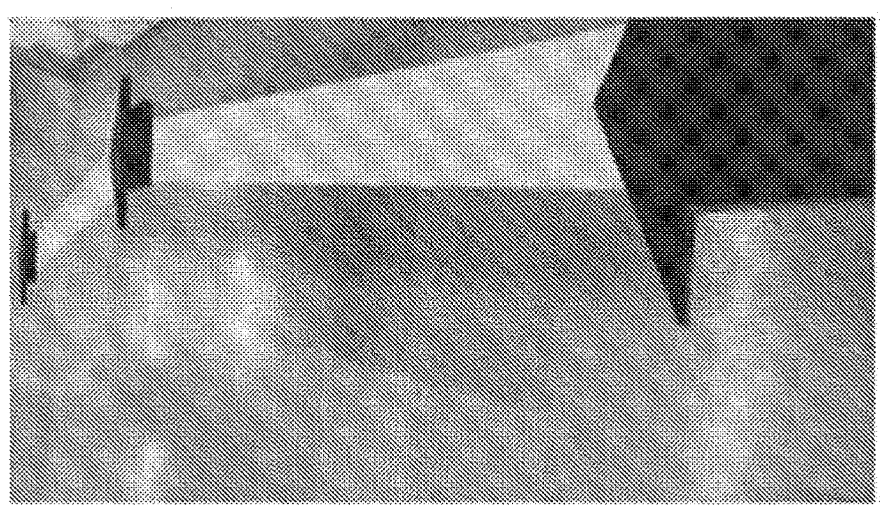
FIG. 2A to FIG. 2C is an existing system illustrating arrow direction not pointing towards heading direction.
Figure 2B:
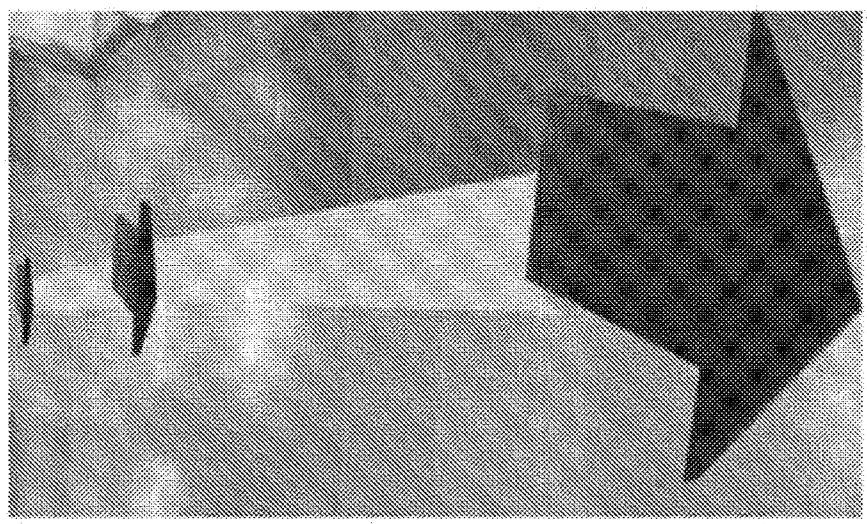
Figure 2A:
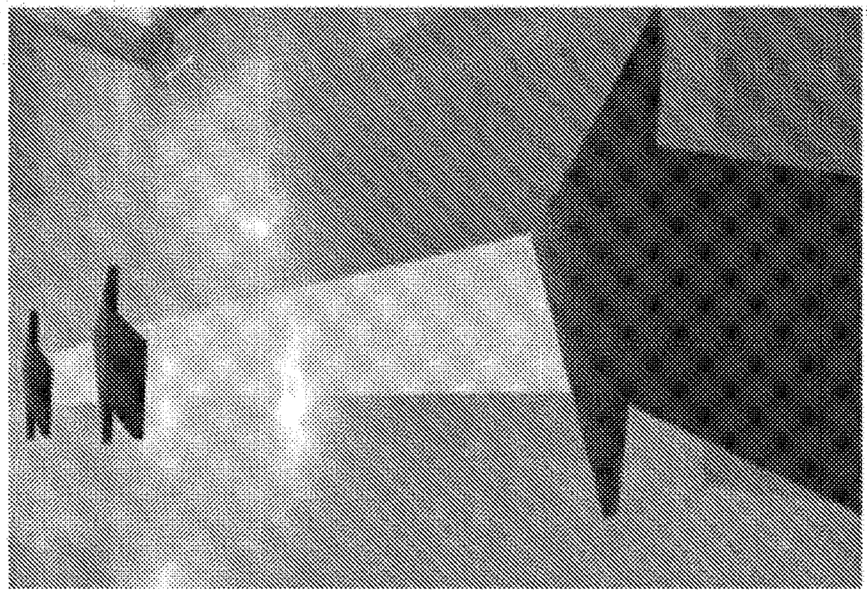

The following is a detailed description of embodiments of the disclosure depicted in the accompanying drawings. The embodiments are in such detail as to clearly communicate the disclosure. If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The present disclosure relates, in general, to indoor navigation systems, and more specifically, relates to a system and method for providing route guidance using augmented reality. The proposed system disclosed in the present disclosure overcomes the drawbacks, shortcomings, and limitations associated with the conventional system by providing augmented reality (AR) based indoor navigation system that can include a processor operatively coupled to a memory, the memory storing instructions executable by the processor to obtain a set of orientation parameters of a subject based on one or more sensors accommodated in the computing device that is associated with the subject in a venue. The set of orientation parameters pertaining to the position and face orientation of the subject and the venue can be any indoor location.

The processor can determine one or more motion parameters associated with the subject to reach the destination from a target location based on one or more sensors associated with the computing device. The one or more motion parameters pertaining to the expected face orientation of the subject. Further, the processor can generate a set of arrows indicating at least one direction of the path from the target location of the subject to the destination, wherein when the set of orientation parameters of the subject deviates from the one or more motion parameters of the subject, the processor configured to calculate a degree of rotation for the set of arrows indicating the at least one direction of the path to align the set of arrows indicating the at least one direction of the path along the desired direction to reach the destination. The set of arrows indicating at least one direction of the path from the target location of the subject to the destination of the subject is displayed to facilitate route guidance, where the route guidance is AR based route guidance.

Augmented reality applications use sensors on mobile devices to determine the position and orientation of the devices. Using this information, the devices can then "augment" the user's view of the surrounding area with synthetically generated graphics that are constructed using a spatial coordinate system of the neighboring area constructed to form the device's location, orientation, and possible other sensed context information. For example, computer-generated graphics are superimposed on a representation of the surrounding area. The present disclosure can be described in enabling detail in the following examples, which may represent more than one embodiment of the present disclosure.

The advantages achieved by the system of the present disclosure can be clear from the embodiments provided herein. The present disclosure provides an efficient route guidance system that determines a path from the target location of the subject to the destination of the subject. The system aligns the directional indicator along the heading direction of the subject when the initial facing of the subject while starting the application is not the same as the expected face orientation. Further, the system provides an estimated degree of rotation for improving the preciseness of route guidance. The description of terms and features related to the present disclosure shall be clear from the embodiments that are illustrated and described; however, the invention is not limited to these embodiments only. Numerous modifications, changes, variations, substitutions, and equivalents of the embodiments are possible within the scope of the present disclosure. Additionally, the invention can include other embodiments that are within the scope of the claims but are not described in detail with respect to the following description.

Figure 3:
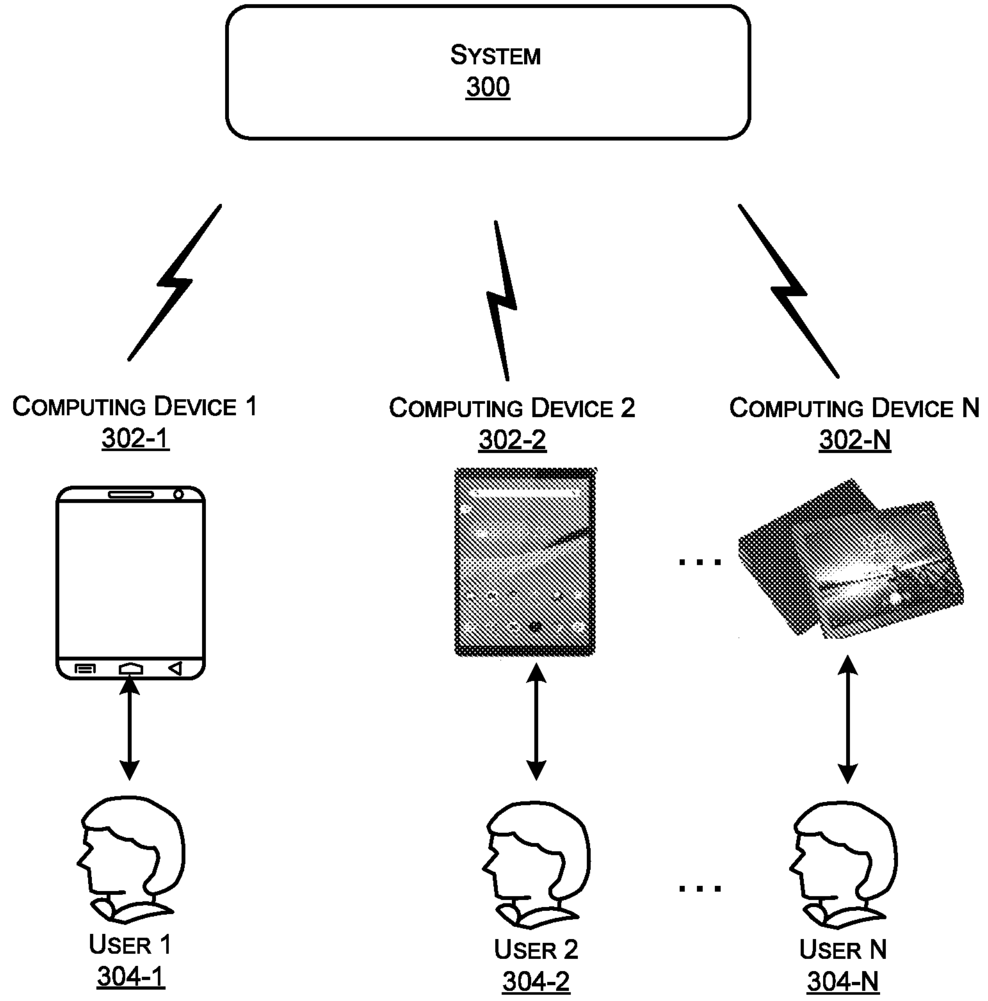
FIG. 3 illustrates a network implementation of an augmented reality (AR) based indoor navigation system in accordance with an embodiment of the present disclosure.

FIG. 3 illustrates a network implementation of an augmented reality (AR) based indoor navigation system in accordance with an embodiment of the present disclosure.

Referring to FIG. 3, an augmented reality (AR) based indoor navigation system 300 (also referred to as system 300, herein) may assist users in real-life navigation scenarios. System 300 is configured to facilitate real-life navigation within a venue. The venue is selected from a store, a supermarket, a shopping center, a mall, hospitals and the like. Although the present subject matter is explained considering that it may be understood that the system 300 may also be implemented as an application in a variety of computing devices (302-1 to 302-N (which are collectively referred to as computing device 302, herein)). The computing device 302 may include a mobile terminal, a tablet computer, and any combination thereof. It would be appreciated that the system 300 may be accessed by multiple users/subjects (304-1 to 304-N (which are collectively referred to as subject 304, herein)) through a set of instructions residing in the computing devices 302. In an embodiment, the mobile terminal may include a mobile device, a tablet computer, or any combination thereof. In some embodiments, the mobile device may include, a smart mobile device, tablets, an augmented reality device or any combination thereof.

In an embodiment, the computing device 302 e.g., a mobile terminal may be equipped with one or more sensors. The one or more sensors may include a global positioning system (GPS) device, a camera, an inertial measurement unit (IMU) sensor, a geomagnetic sensor, a pressure sensor, and the like. The camera may be configured to obtain one or more images that include scenes within the viewing angle of the camera. The GPS device may refer to a device that can receive geolocation and time information from GPS satellites and calculate the device's geographical position. The IMU sensor may refer to an electronic device that measures an object's specific force, angular rate, and sometimes the magnetic field surrounding the object, using various inertial sensors, such as an accelerometer, a gyroscope, or a magnetometer. In an embodiment, the IMU sensor may provide real-time pose information of the mobile terminal, including the position and orientation of the mobile terminal at each time point.

In an exemplary embodiment, the proposed system 300 uses built-in sensors of mobile terminal 302 e.g., smartphone to get user orientation and integrates with ARCore software development kit (SDK) to display AR guidance using known latitude and longitude of waypoints on a given route. System 300 can include four components that are as follows:

- Way finding: An array of latitude and longitude of waypoints for a given route is given. A waypoint can be an intersection, a point of interest (POI), or the middle of a corridor. The heading (angle from True North to source-destination line) can be obtained using mathematical calculations. This will be the expected face orientation of the user.
- Motion Tracking: This module uses the getOrientation() of the android sensor manager to get user orientation from inertial measurement unit (IMU) sensors of smartphones. At each waypoint and along the expected face orientation, if the user's orientation is the same as the expected face orientation, the directional indicator may show in the real-world environment. The directional indicator shall always show in the direction of expected face orientation.
- Route Guidance: In order to place the directional indicator in a real-world environment, a position half a meter in front of the camera is calculated along the camera shooting direction. To calculate position, camera position (Vector) and camera shooting direction (Vector) are obtained. The coordinate of the 3D model is obtained by vector addition of the above two vectors. Distance between two consecutive directional indicators may always be more than 1 meter. A path joining two consecutive directional indicators may be shown in a real-world environment.

Figure 5:
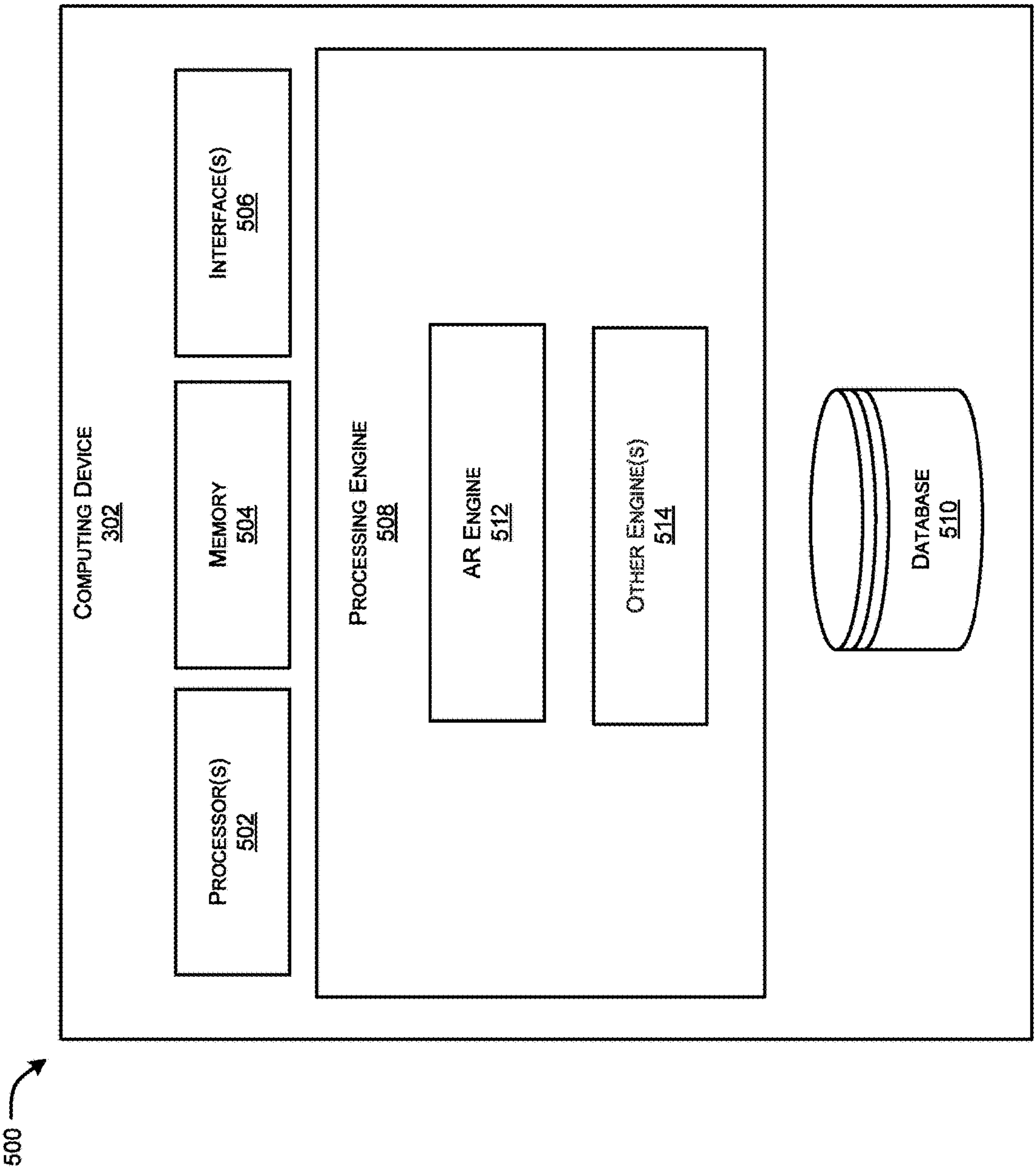
FIG. 5 illustrates exemplary functional components of the proposed system in accordance with an embodiment of the present disclosure.

In an embodiment, the computing device 302 can include a processor 502 operatively coupled to a memory 504 shown in FIG. 5, the memory 504 storing instructions executable by the processor 502 to obtain a set of orientation parameters of the subject 304 based on one or more sensors accommodated in the computing device 302 that is associated with the subject 304 in a venue. The subject can carry, hold, or use the computing device 302 in different orientations in a constrained or unconstrained manner. The set of orientation parameters pertaining to the position and face orientation of the subject. In an exemplary embodiment, the venue can be an indoor location.

The processor 502 can determine one or more motion parameters associated with the subject 304 to reach the destination from a target location based on one or more sensors associated with the computing device 302. The one or more motion parameters pertaining to the expected face orientation i.e., heading direction of the subject 304. The processor 502 can generate a set of arrows indicating at least one direction of the path from the target location of the subject to the destination, where when the set of orientation parameters of the subject deviates from the one or more expected motion parameters of the subject, the processor 502 configured to calculate a degree of rotation for the set of arrows indicating the at least one direction of the path to align the set of arrows indicating the at least one direction of the path along the desired direction to reach the destination. The set of arrows indicating at least one direction of the path from the target location of the subject to the destination of the subject is displayed to facilitate route guidance.

In an embodiment, the processor 502 is configured to generate the set of arrows to align along the heading direction of the subject when the initial face orientation of the subject 304 is same as the expected face orientation. In another embodiment, the processor 502 is configured to calculate the degree of rotation to generate the set of arrows to align along the heading direction of the subject when the initial face orientation of the subject is not the same as the expected face orientation. The processor 502 calculates and uses the estimated degree of rotation for improving the preciseness of route guidance. The estimated degree of rotation is AoR+H−(I−a), where AoR=Angle of Rotation required to reach true north (clockwise) from nearest Ro (in an anti-clockwise direction), Ro=type of expected face orientation in earth coordinate systems, values=[0, 7], H=Heading of a line between two latitude and longitude, I=Initial azimuth angle from IMU sensor when application started a=nearest angle corresponding to Ro (in an anti-clockwise direction).

For example, a user may be inside a store and may utilize a smartphone or other portable electronic device to request assistance for navigation or route guidance. Based on the input of the user, the smartphone associated with the user may operate by parsing the user query to extract from it the desired destination and current target location of the user. The system may determine a walking route from the current location to the destination. The system may generate walking instructions for such route, and convey them to the user by animation or other means, or as a gradually exposed set of instructions that keep being updated as the user walks. The AR-based navigation instructions are generated, displayed and/or conveyed to the user, may include AR-based arrows or indicators that are shown as an overlay on top of an aisle or other means, which guide the user to walk or move or turn to a particular direction to reach the destination.

The position and orientation of the user within the store or the venue can be derived from his/her smartphone. Generally, the smartphone can have a different orientation with respect to the user's body. Consequently, when initial-facing of the user while starting the application is not the same as the expected face orientation and the user starts moving towards the heading direction, the system can calculate the degree of rotation for directional indicator e.g., set of arrows to make it align along the heading direction of the user.

Figure 4D:
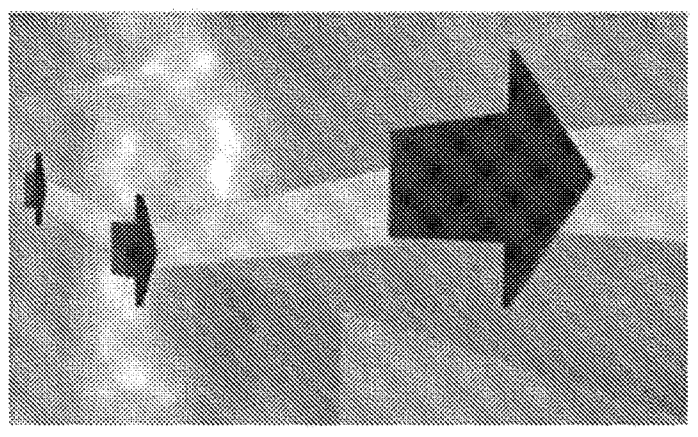
FIG. 4A to FIG. 4D is a system illustrating arrow direction same as heading direction, in accordance with an embodiment of the present disclosure.
Figure 4C:
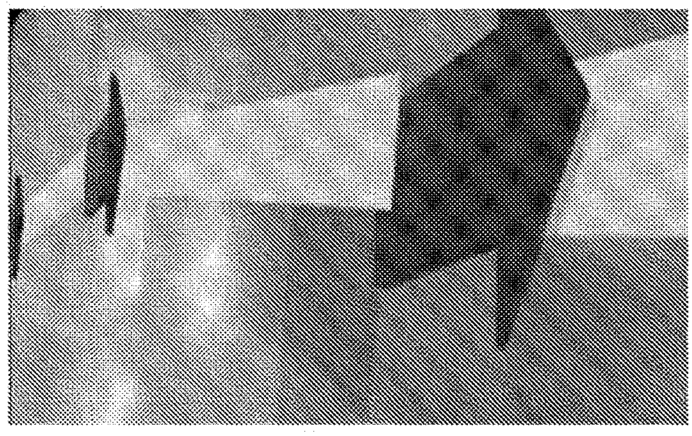
Figure 4B:
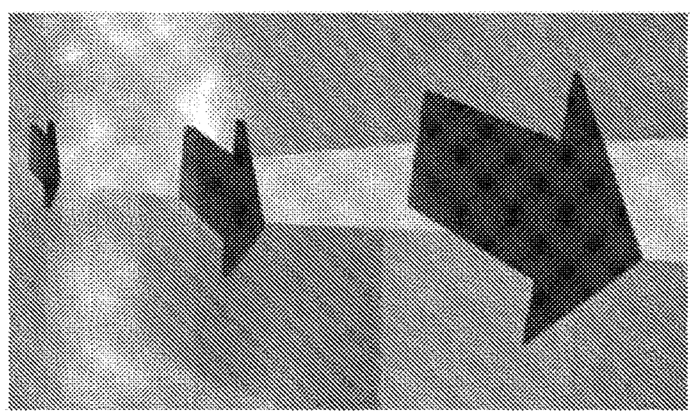
Figure 4A:
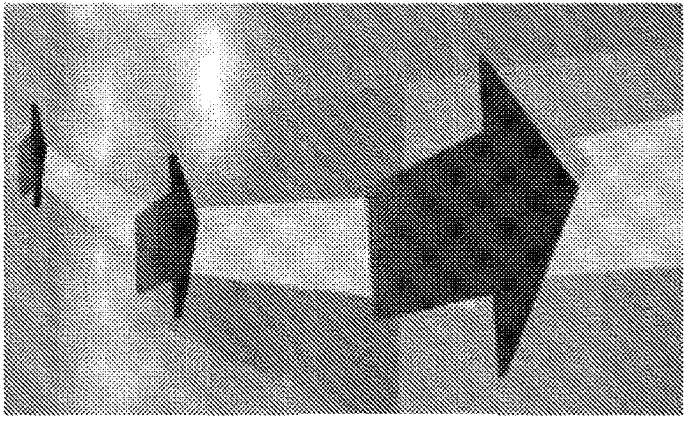

The degree of rotation for the directional indicator to make it align along the heading direction as shown in FIG. 4A to 4D respectively. As shown in FIG. 4A, the facing of the user is north and the heading direction is towards the east. An arrow is pointing towards the east same as the heading direction and the path is drawn towards the heading direction i.e., east. In FIG. 4B, the facing of the user is towards the east and the heading direction is towards the east and the arrow is pointing towards the east same as the heading direction and path are drawn towards the heading direction i.e., east. In FIG. 4C, the facing of the user is towards the west and heading direction is towards the east and the arrow is pointing towards the east same as the heading direction and the path is drawn towards the heading direction as east. In FIG. 4D, the facing of the user is towards the southwest and heading direction is towards the east and the arrow is pointing towards the east same as the heading direction and the path is drawn towards the heading direction i.e., east.

Thus, the present invention overcomes the drawbacks, shortcomings, and limitations associated with existing solutions, and provides an efficient route guidance system that determines the path from the target location of the subject to the destination of the subject effectively. The system aligns the directional indicator along the heading direction of the subject when the initial facing of the subject while starting the application is not the same as the expected face orientation. Further, the system 300 provides an estimated degree of rotation for improving the preciseness of route guidance.

FIG. 5 illustrates exemplary functional components 500 of the proposed system in accordance with an embodiment of the present disclosure.

In an aspect, the computing device 302 comprises one or more processor(s) 502. The one or more processor(s) 502 may be implemented as one or more microprocessors, microcomputers, microcontrollers, digital signal processors, central processing units, logic circuitries, and/or any devices that manipulate data based on operational instructions. Among other capabilities, one or more processor(s) 502 are configured to fetch and execute computer-readable instructions stored in a memory 504 of the computing device 302. The memory 504 may store one or more computer-readable instructions or routines, which may be fetched and executed to create or share the data units over a network service. The memory 504 may comprise any non-transitory storage device including, for example, volatile memory such as RAM, or non-volatile memory such as EPROM, flash memory, and the like.

The computing device 302 may also comprise an interface(s) 506. The interface(s) 506 may comprise a variety of interfaces, for example, interfaces for data input and output devices, referred to as I/O devices, storage devices, and the like. The interface(s) 506 may facilitate communication of computing device 302. The interface(s) 506 may also provide a communication pathway for one or more components of the computing device 302. Examples of such components include, but are not limited to, processing engine(s) 508 and database 510.

The processing engine(s) 508 may be implemented as a combination of hardware and programming (for example, programmable instructions) to implement one or more functionalities of the processing engine(s) 508. In the examples described herein, such combinations of hardware and programming may be implemented in several different ways. For example, the programming for the processing engine(s) 508 may be processor-executable instructions stored on a non-transitory machine-readable storage medium and the hardware for the processing engine(s) 508 may comprise a processing resource (for example, one or more processors), to execute such instructions. In the present examples, the machine-readable storage medium may store instructions that, when executed by the processing resource, implement the processing engine(s) 508. In such examples, computing device 302 may comprise the machine-readable storage medium storing the instructions and the processing resource to execute the instructions, or the machine-readable storage medium may be separate but accessible to computing device 302 and the processing resource. In other examples, the processing engine(s) 508 may be implemented by electronic circuitry.

The database 510 may comprise data that is either stored or generated as a result of functionalities implemented by any of the components of the processing engine(s) 508 or the computing device 302. In an exemplary embodiment, the processing engine(s) 508 may include an AR engine 512 and other engines(s) 514. The other engine(s) 514 can supplement the functionalities of the processing engine 508 or the computing device 302.

Figure 6:
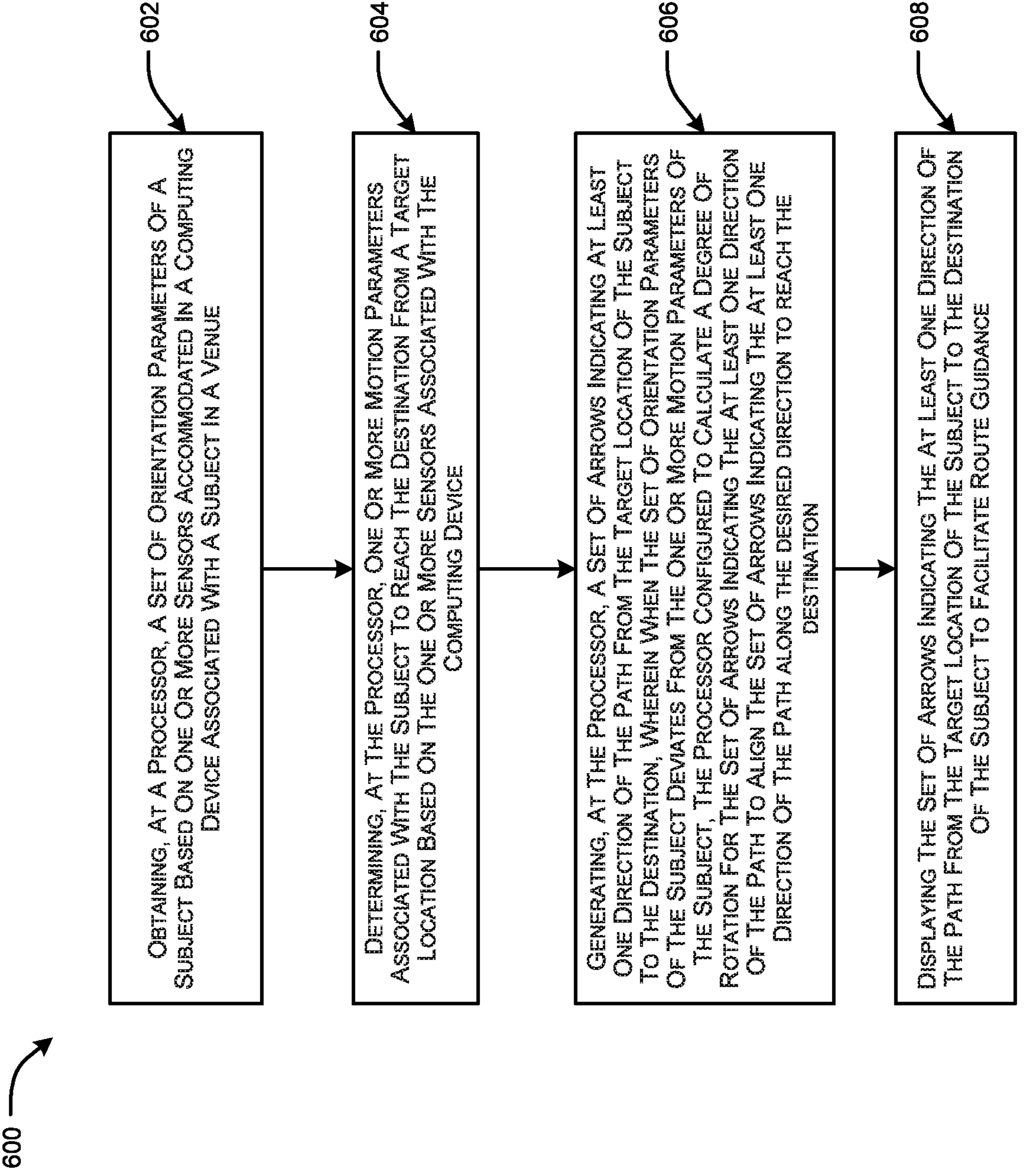
FIG. 6 illustrates an exemplary flow chart of a method for providing route guidance in accordance with an embodiment of the present disclosure.
Figures 7A, 7B, 7C, 7D:
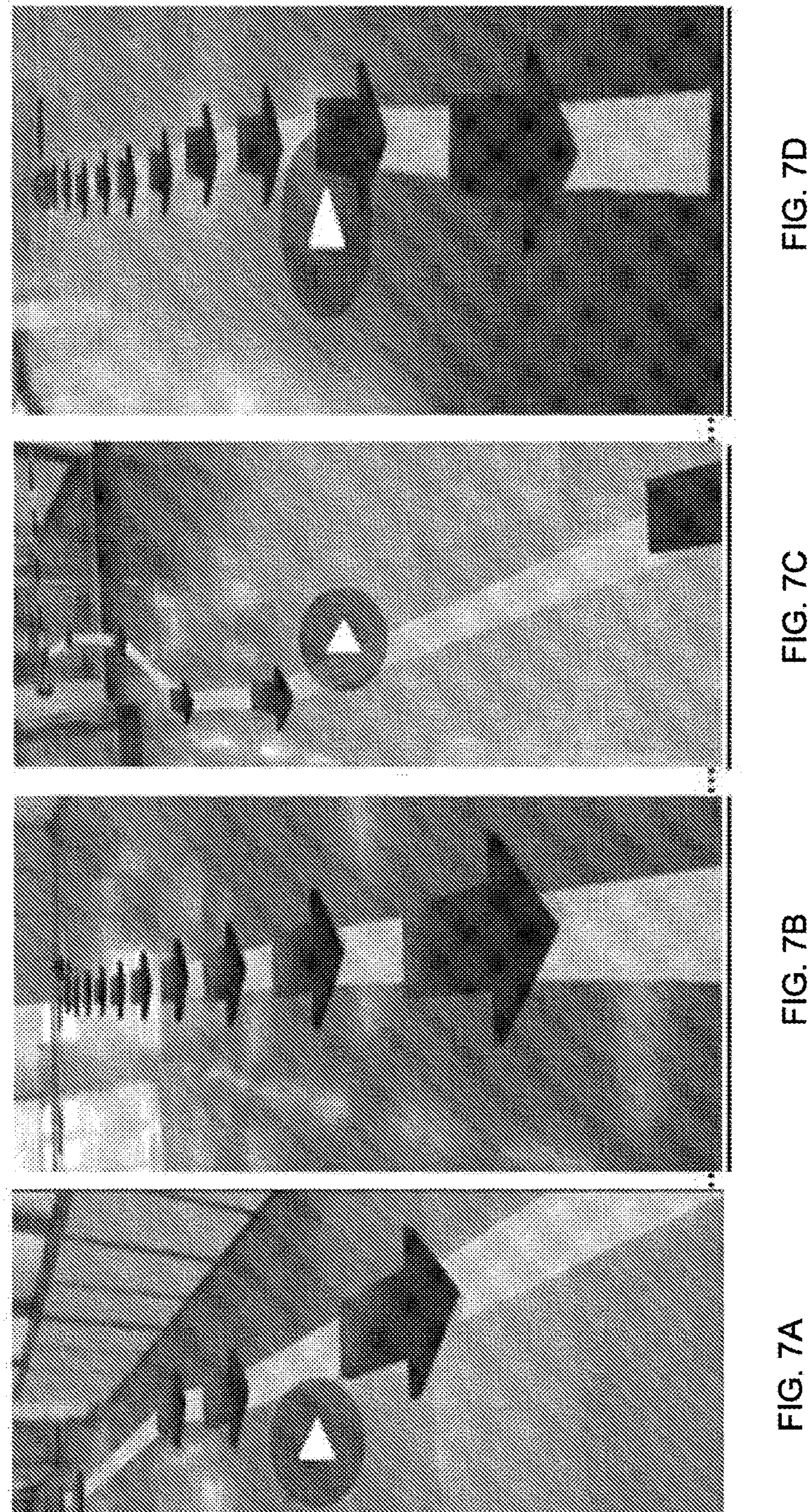
FIG. 7A to FIG. 7D illustrates an experimental result of the proposed system, in accordance with an embodiment of the present disclosure.

FIG. 6 illustrates an exemplary flow chart of a method for providing route guidance in accordance with an embodiment of the present disclosure. Referring to FIG. 6, the method includes at block 602, the set of orientation parameters of the subject is obtained based on one or more sensors accommodated in the computing device that is associated with a subject in a venue.

At block 604, one or more motion parameters associated with the subject are determined to reach the destination from a target location based on one or more sensors associated with the computing device.

At block 606, generate a set of arrows indicating at least one direction of the path from the target location of the subject to the destination, wherein when the set of orientation parameters of the subject deviates from the one or more motion parameters of the subject, the processor configured to calculate a degree of rotation for the set of arrows indicating the at least one direction of the path to align the set of arrows indicating the at least one direction of the path along the desired direction to reach the destination and at block 608, display the set of arrows indicating the at least one direction of the path from the target location of the subject to the destination of the subject to facilitate route guidance.

EXPERIMENTAL RESULTS

FIG. 7A to FIG. 7D illustrates an experimental result 700 of the proposed system, in accordance with an embodiment of the present disclosure.

The experiment is performed on three different phones and the result is as per expectation in all the phones shown. When the magnetic sensor does not give accurate reading while the application is started, the mobile phone needs to be calibrated once to get a close reading so that the initial facing angle (I) can be as accurate as possible. The initial facing angle (I) is used throughout the path from source to destination via waypoints as shown in FIG. 7A to FIG. 7D respectively.

It will be apparent to those skilled in the art that the system 300 of the disclosure may be provided using some or all of the mentioned features and components without departing from the scope of the present disclosure. While various embodiments of the present disclosure have been illustrated and described herein, it will be clear that the disclosure is not limited to these embodiments only. Numerous modifications, changes, variations, substitutions, and equivalents will be apparent to those skilled in the art, without departing from the spirit and scope of the disclosure, as described in the claims.

ADVANTAGES OF THE PRESENT INVENTION

The present invention provides a system that determines a path from the target location of the subject to the destination of the subject effectively.

The present invention provides a system that aligns the directional indicator along the heading direction of the subject when the initial facing of the subject while starting the application is not the same as expected face orientation.

Another object of the present disclosure is to provide a system that provides estimated degree of rotation for improving the preciseness of route guidance.

The present invention provides an efficient route guidance system.

The present invention provides the computing device to be used in any orientation with respect to the user during the different activities.

We claim:

1. A system (300) for providing route guidance using augmented reality, the system comprising:

a processor (502) operatively coupled to a memory (504), the memory storing instructions executable by the processor to:

obtain a set of orientation parameters of a subject (304) based on one or more sensors accommodated in a computing device (302) associated with the subject in a venue;

determine one or more motion parameters associated with the subject to reach the destination from a target location based on the one or more sensors associated with the computing device (302);

generate a set of arrows indicating at least one direction of the path from the target location of the subject (304) to the destination, wherein when the set of orientation parameters of the subject deviates from the one or more motion parameters of the subject, the processor configured to calculate a degree of rotation for the set of arrows indicating the at least one direction of the path to align the set of arrows indicating the at least one direction of the path along the desired direction to reach the destination; and display the set of arrows indicating the at least one direction of the path from the target location of the subject to the destination of the subject (304) to facilitate route guidance.

2. The system as claimed in claim 1, wherein the one or more motion parameters pertaining to expected face orientation of the subject (304).

3. The system as claimed in claim 1, wherein the set of orientation parameters pertaining to position and face orientation of the subject (304).

4. The system as claimed in claim 1, wherein the processor (502) is configured to calculate the degree of rotation to generate the set of arrows align along the heading direction of the subject, when the initial face orientation of the subject is not the same as the expected face orientation.

5. The system as claimed in claim 1, wherein the processor (502) is configured to generate the set of arrows align along the heading direction of the subject (304), when the initial face orientation of the subject is the same as the expected face orientation.

6. The system as claimed in claim 1, wherein the processor (502) calculates and uses the estimated degree of rotation for improving the preciseness of route guidance.

7. The system as claimed in claim 1, wherein the estimated degree of rotation is AoR+H−(I−a), wherein the EOR is calculated using the angle of rotation (AoR) required to reach clockwise from the nearest expected face orientation in earth coordinate systems (Ro) in an anti-clockwise direction, heading of the line between two latitudes and longitude (H), initial azimuth angle from the one or more sensors (I), and nearest angle (a) corresponding to (Ro) in the anti-clockwise direction.

8. The system as claimed in claim 1, wherein the venue is selected from a store, a supermarket, a shopping center, a mall, a hospital, and any combination thereof.

9. The system as claimed in claim 1, wherein the one or more sensors provide real-time information of the computing device associated with the subject, the real-time information pertaining to the position and orientation of the computing device at each time point.

10. A method (600) for providing route guidance using augmented reality, the method comprising:

obtaining (602), at a processor, a set of orientation parameters of a subject based on one or more sensors accommodated in a computing device associated with the subject in a venue;

determining (604), at the processor, one or more motion parameters associated with the subject to reach the destination from a target location based on the one or more sensors associated with the computing device;

generating (606), at the processor, a set of arrows indicating at least one direction of the path from the target location of the subject to the destination, wherein when the set of orientation parameters of the subject deviates from the one or more motion parameters of the subject, the processor configured to calculate a degree of rotation for the set of arrows indicating the at least one direction of the path to align the set of arrows indicating the at least one direction of the path along the desired direction to reach the destination; and displaying (608) the set of arrows indicating the at least one direction of the path from the target location of the subject to the destination of the subject to facilitate route guidance.

* * * * *